(12) United States Patent
Wiegman

(10) Patent No.: US 11,970,276 B2
(45) Date of Patent: Apr. 30, 2024

(54) MODULAR BATTERY CONFIGURATION WITH CENTRALIZED BUS ON AN ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/892,273

(22) Filed: Aug. 22, 2022

(65) Prior Publication Data

US 2024/0059418 A1 Feb. 22, 2024

(51) Int. Cl.
| | | |
|---|---|---|
| *B64D 27/24* | (2006.01) | |
| *B60L 50/60* | (2019.01) | |
| *B64C 29/00* | (2006.01) | |
| *H01M 50/204* | (2021.01) | |
| *H01M 50/249* | (2021.01) | |
| *H01M 50/258* | (2021.01) | |
| *H01M 50/50* | (2021.01) | |

(52) U.S. Cl.
CPC .............. *B64D 27/24* (2013.01); *B60L 50/66* (2019.02); *B64C 29/0025* (2013.01); *H01M 50/204* (2021.01); *H01M 50/249* (2021.01); *H01M 50/258* (2021.01); *B60L 2200/10* (2013.01); *B64D 2221/00* (2013.01); *H01M 50/50* (2021.01); *H01M 2220/20* (2013.01)

(58) Field of Classification Search
CPC ..... B64D 27/24; B64D 2221/00; B60L 50/66; B60L 2200/10; B64C 29/0025; H01M 50/249; H01M 50/204; H01M 50/258; H01M 50/50; H01M 2220/20
See application file for complete search history.

(56) References Cited

U.S. PATENT DOCUMENTS

| | | |
|---|---|---|
| 4,067,139 A | 1/1978 | Pinkerton et al. |
| 8,469,306 B2 | 6/2013 | Kuhn, Jr. |
| 9,340,299 B2 | 5/2016 | Yates et al. |
| 10,322,824 B1 | 6/2019 | Demont |
| 10,569,891 B2 | 2/2020 | Ferran et al. |
| 10,960,984 B2 | 3/2021 | Moxon |

(Continued)

FOREIGN PATENT DOCUMENTS

EP 3796413 3/2021

OTHER PUBLICATIONS

Steve Hanley, Rolls-Royce Claims Its Latest Electric Airplane Battery Has The World's Highest Energy Density, Jan. 29, 2020.

(Continued)

*Primary Examiner* — Joshua J Michener
*Assistant Examiner* — Cindi M Curry
(74) *Attorney, Agent, or Firm* — Hoffman Warnick LLC

(57) ABSTRACT

In an aspect, a modular battery configuration with a centralized bus on an electric aircraft, including an electric aircraft which comprises a propulsor configured to generate thrust and a centralized electrical bus connected to the propulsor. A plurality of modular battery packs is configured to provide electricity to the centralized electrical bus, wherein the plurality of modular battery packs is arranged about a center of gravity of the electric aircraft.

20 Claims, 8 Drawing Sheets

(56) References Cited

U.S. PATENT DOCUMENTS

| | | | |
|---|---|---|---|
| 11,148,819 B2 | 10/2021 | Demont et al. | |
| 11,198,515 B2 | 12/2021 | Demizu et al. | |
| 11,230,384 B2 | 1/2022 | Lynn et al. | |
| 2008/0238202 A1* | 10/2008 | Kern | H02P 9/302 |
| | | | 307/53 |
| 2018/0050807 A1* | 2/2018 | Kupiszewski | H02J 4/00 |
| 2018/0065739 A1* | 3/2018 | Vondrell | B64C 29/0033 |
| 2019/0329882 A1* | 10/2019 | Baity | B64C 29/0033 |
| 2020/0277062 A1* | 9/2020 | Becker | B64D 27/06 |
| 2021/0031934 A1* | 2/2021 | Becker | B64C 1/16 |
| 2021/0229821 A1* | 7/2021 | Alt | H02J 1/082 |
| 2021/0339881 A1 | 11/2021 | Bevirt et al. | |
| 2021/0391627 A1 | 12/2021 | Villanueva et al. | |
| 2022/0169146 A1* | 6/2022 | Lohe | H01M 10/48 |
| 2022/0177145 A1 | 6/2022 | Melack | |
| 2022/0250508 A1* | 8/2022 | Donovan | B60L 50/64 |

OTHER PUBLICATIONS

Valentin Guigue, Conceptual Design of an Electrical Aircraft—Battery Assessment, Sep 30, 2021.

* cited by examiner

MODULAR BATTERY CONFIGURATION WITH CENTRALIZED BUS ON AN ELECTRIC AIRCRAFT

FIELD OF THE INVENTION

The present invention generally relates to the field of modular battery configurations in electric aircrafts. In particular, the present invention is directed to modular battery configuration with a centralized bus on an electric aircraft.

BACKGROUND

It is important to manage the modular battery configuration in an electric vehicle. The magnitude of this importance increases when electrical power has to be redistributed or removed. Effective and timely configuration of modular batteries can be a difficult task and can pose challenges.

SUMMARY OF THE DISCLOSURE

In an aspect, a removeable modular battery configuration with a centralized bus on an electric aircraft is provided. The system includes a propulsor configured to generate one of more lift or lateral thrust and thereby propel the electric aircraft. A centralized electrical bus is electrically connected to the at least a propulsor. A plurality of modular battery packs are configured to provide electricity to the centralized electrical bus, wherein the plurality of modular battery packs is arranged about a center of gravity of the aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
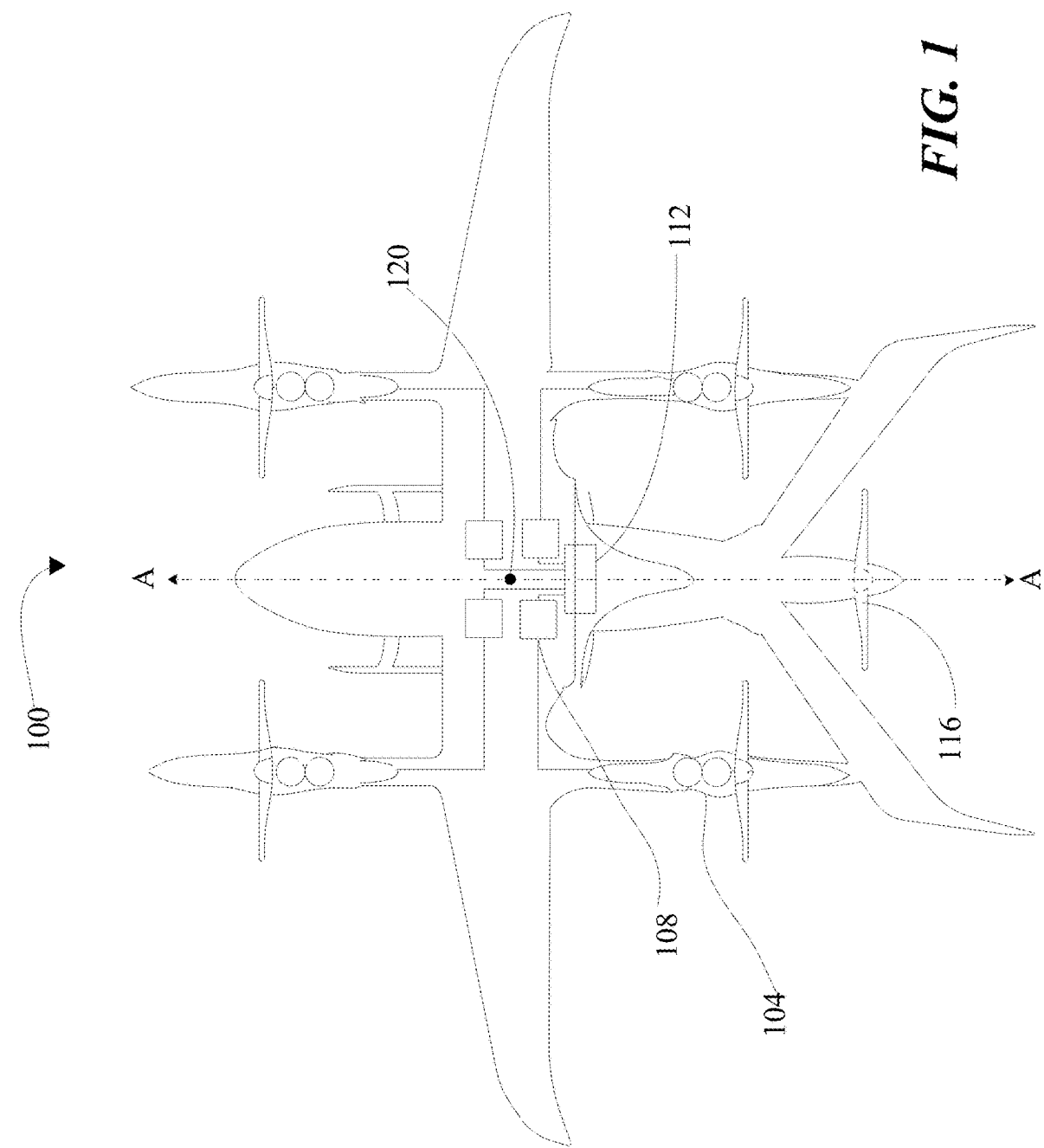
FIG. 1 is a block diagram of an exemplary embodiment of a modular battery configuration on an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," "upward," "downward," "forward," "backward" and derivatives thereof shall relate to the orientation in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for modular battery configuration on an electric aircraft. In one or more embodiments, the system may include a modular battery configuration with a centralized electrical bus.

The modular battery configuration system with a centralized electrical bus provides redundancy and the elimination of single point failures, such as failure in operation of a flight component due to loss of power, that can make the electric aircraft non-operable in flight. In an embodiment, the centralized electrical bus may comprise a ring bus. A ring bus configuration communicatively connected to a controller is used to redistribute electrical load. Aspects of the present disclosure can be used to selectively redistribute load from selected energy sources in the event of a fault associated with said energy source and/or an associated component. Aspects of the present disclosure can also be used to selectively redistribute load from selected energy sources in the event of the need, or desire, to provide additional electrical power to a particular aircraft component. This is so, at least in part, because a unique ring bus configuration allows for selective electrical merger of two or more bus sections of ring bus. Aspects of the present disclosure advantageously allow for enhanced versatility in redistributing electrical load between different components of an electric aircraft, and desirably permit adaptability with minimal or reduced effect on aircraft performance. The system also comprises an electric propulsor configured to generate lift and thrust utilization of a controller, desirably, further adds to the operational safety and control of the high voltage distribution by transferring power to and from various components of the electric aircraft and/or system at varying levels. Exemplary embodiments illustrating aspects of the present disclosure are described below in the context of several specific examples.

Referring now to FIG. 1, an exemplary embodiment of a modular battery configuration on an electric aircraft is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 1, aircraft 100 may include an electrically powered aircraft. In embodiments, electrically powered aircraft may be an electric vertical takeoff and landing (eVTOL) aircraft. Aircraft 100 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft contains at least an electric propulsor 116 and may contain an electric propulsor assembly. Electric propulsion assembly may include any electric propulsion assembly as described in U.S. Nonprovisional application Ser. No. 16/703,225, filed on Dec. 4, 5019, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 1.

Still referring to FIG. 1, aircraft 100 includes a plurality of modular battery packs 108. A modular battery pack as used in this disclosure is a battery pack that has been designed to work in tandem with other battery packs of the same specification. By adding or reducing batteries in a modular set up, it is possible to fulfill the power requirement without being limited to a set capacity or voltage. The modular battery packs may be arranged substantially symmetrically about a center of gravity 120 of the aircraft or lateral axis of the aircraft manner. As used in this disclosure substantially symmetrically means being largely symmetrical in the relative position of parts on opposite sides of a dividing line or median plane or about a center or axis.

Still referring to FIG. 1, a plurality of modular battery packs 108 are in electrical communication with and configured to provide electricity to the centralized electrical bus 112. A centralized electrical bus 112 for the purposes of this disclosure and in electrical parlance is any common connection to which any number of loads, which may be connected in parallel, and share a relatively similar voltage may be electrically coupled. Bus 112 may refer to power busses, audio busses, video busses, computing address busses, and/or data busses. Bus 112 may be responsible for conveying electrical energy stored in battery pack to at least a portion of an electric aircraft. Bus 112 may be additionally or alternatively responsible for conveying electrical signals generated by any number of components within battery pack to any destination on or offboard an electric aircraft. Battery management system head unit may comprise wiring or conductive surfaces only in portions required to electrically couple bus to electrical power or necessary circuits to convey that power or signals to their destinations. The centralized electrical bus 112 is electrically connected to the at least propulsor 116. In some embodiments propulsor 116 may be electric. For the purposes of this disclosure, propulsor 116 is a component or device used to propel a craft by exerting force on a fluid medium, which may include a gaseous medium such as air or a liquid medium such as water. Propulsor 116 may include any device or component that consumes electrical power on demand to propel an electric aircraft in a direction or other vehicle while on ground or in-flight. For example, and without limitation, propulsor 116 may include a rotor, propeller, paddle wheel, and the like thereof. In an embodiment, propulsor 116 can include a thrust element which may be integrated into the propulsor 116. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. In an embodiment, propulsor 116 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor 116 may include a rotating power-driven hub, to which are attached several radial airfoil-section blades such that the whole assembly rotates about a longitudinal axis. In one or more exemplary embodiments, a propulsor 116 may include a vertical propulsor or a forward propulsor. A forward propulsor may include a propulsor configured to propel electric aircraft 104 in a forward direction. A vertical propulsor may include a propulsor configured to propel electric aircraft 104 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In an embodiment, propulsor 116 may include a propeller, a blade, or the like. The function of a propeller is to convert rotary motion from an engine or other power source into a swirling slipstream which pushes the propeller forwards or backwards. The propulsor 116 may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g., a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates Still referring to FIG. 1, modular battery pack 108 may include any number of batteries configured to power an electric vehicle. Modular battery pack 108 may include any number of cells in any orientation. For example, the modular battery pack may be a battery module comprising a plurality of battery cells. The battery cells may comprise an electrochemical cell and may further comprise galvanic cells, electrolytic cells, fuel cells, flow cells, and/or voltaic cells. In some embodiments, modular battery pack 108 may be removed from the aircraft 104, wherein the removal has a center of gravity effect on the aircraft's center of gravity 120. A center of gravity 120 as used in this disclosure is a point from which the weight of the aircraft in concentrated. For example, the center of gravity 120 may be in between the wings of the aircraft, a midway point between the front and end of the aircraft 104 on longitudinal axis A and the like. The center of gravity effect 120 may be within a tolerable range of center of gravity effects. Modular battery pack 108 may be located within a: floor, wing, fuselage, and/or nose of aircraft 104. A floor, as used in this disclosure is the surface on which a passenger, operator, passenger, payload, or other object would rest on due to gravity when the aircraft is in flight orientation or sitting on ground. Generally, the floor is a structural part of the aircraft made of lightweight floor panels. The floor panels required to withstand a threshold level of shear force to brace the floor beams of the aircraft if there is a crash. For example, modular battery pack 108 may be located on the floor of the aircraft at a midway point between the front and end of aircraft 104, on the floor at the front end of aircraft 104, on the floor at the back end of aircraft 104 and the like. A wing, as used in this disclosure, is defined as a structure which includes airfoils configured to create a pressure differential resulting in lift. Wings are generally disposed on the left and right sides of the aircraft symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB aircraft where no strong delineation of body and wing exists. A wing's cross section geometry comprises an airfoil. An "airfoil" as used in this disclosure, is a shape specifically designed such that a fluid flowing above and below it exert differing levels of pressure against the top and bottom surface. In embodiments, the bottom surface of an aircraft can be configured to generate a greater pressure than does the top, resulting in lift. A wing may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Wings may comprise controls surfaces configured to be commanded by a pilot or pilots to change a wing's geometry and therefore its interaction with a fluid medium, like air. For example, modular battery pack 108 may be on located on the on the wing's longitudinal plane where the wing meets the body of aircraft 104, on the wing's plane at the midway point of the wing between where the wing meets the body of aircraft 104 and the end point of wing, on the endpoint of the wing and the like.

As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage may include structural elements that physically support a shape and structure of an aircraft. Structural elements may take a plurality of forms, alone or in combination with other types. For example, the modular battery may be located at the front end of the fuselage, midway point or back end of the fuselage and the like. A nose portion for the purposes of this disclosure refers to any portion of the aircraft forward of the aircraft's fuselage. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion, for the purposes of this disclosure may comprise a swing nose configuration. A swing nose may be characterized by the ability of the nose to move, manually or automatedly, into a differing orientation than its flight orientation to provide an opening for loading a payload into aircraft fuselage from the front of the aircraft. Nose may be configured to open in a plurality of orientations and directions. For example, modular battery pack 108 may be located at the front end, back end, midway point of the nose portion and the like. In some cases, the plurality of battery packs may be located such that removal of one or more battery packs may be achieved in order to lighten the aircraft without negatively impacting one or more of the aerodynamic center and/or center of gravity 120 of aircraft 104. For example, in some cases, one or more batteries may be removed when the aircraft is making a flight that requires less energy.

Still referring to FIG. 1, aircraft 100, wherein plurality of modular battery packs 108 comprises a predetermined arrangement of modular battery packs, and wherein the predetermined arrangement allows removal of at least a modular battery pack from the plurality of modular packs while maintaining a resulting offset of the center of gravity 120 of the electric aircraft within a threshold. As used in this disclosure, a "threshold" is a set range or value identifying an event, such as a crash. For example, threshold may include a temperature threshold to, for example, identify that there is a fire if the temperature threshold is surpassed. Threshold may include a current threshold and/or a change in current threshold identifying that there is, for example, an arc fault. Threshold may include an acceleration threshold. Acceleration threshold may include positive and negative acceleration. Acceleration threshold may include a G-load threshold. For example, when the G-load threshold is exceeded, the aircraft may be in free-fall. Acceleration threshold may include a threshold that, if surpassed, identifies that electric aircraft 108 has decelerated so quickly that it must have crashed.

Still referring to FIG. 1, aircraft includes a fuselage. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage may include structural elements that physically support a shape and structure of an aircraft. Structural elements may take a plurality of forms, alone or in combination with other types. Structural elements may vary depending on a construction type of aircraft such as without limitation a fuselage. Fuselage may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 1, aircraft fuselage may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage orthogonal to a longitudinal (nose to tail) axis of the aircraft and may form a general shape of fuselage. A former may include differing cross-sectional shapes at differing locations along fuselage, as the former is the structural element that informs the overall shape of a fuselage curvature. In embodiments, aircraft skin may be anchored to formers and strings such that the outer mold line of a volume encapsulated by formers and stringers comprises the same shape as aircraft when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 1, fuselage may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 1, fuselage may include a semi-monocoque construction. Semi-monocoque construction, as used herein, is a partial monocoque construction, wherein a monocoque construction is describe above detail. In semi-monocoque construction, aircraft fuselage may derive some structural support from stressed aircraft skin and some structural support from underlying frame structure made of structural elements. Formers or station frames can be seen running transverse to the long axis of fuselage with circular cutouts which are generally used in real-world manufacturing for weight savings and for the routing of electrical harnesses and other modern on-board systems. In a semi-monocoque construction, stringers are thin, long strips of material that run parallel to a longitudinal axis of a fuselage. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck. Stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage. Monocoque comprises only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage may be configurable based on the needs of the eVTOL per specific mission or objective. The general arrangement of components, structural elements, and hardware associated with storing and/or moving a payload may be added or removed from fuselage as needed, whether it is stowed manually, automatedly, or removed by personnel altogether. Fuselage may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage may also be configurable to accept certain specific cargo containers, or a receptable that can, in turn, accept certain cargo containers.

Still referring to FIG. 1, aircraft 100 includes a plurality of flight components. As used in this disclosure a "flight component" is a component that promotes flight and guidance of an aircraft. In an embodiment, flight component may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components may include at least a lift propulsor component. As used in this disclosure a "lift propulsor component" is a component and/or device used to propel a craft upward by exerting downward force on a fluid medium, which may include a gaseous medium such as air or a liquid medium such as water. Lift propulsor component may include any device or component that consumes electrical power on demand to propel an electric aircraft in a direction or other vehicle while on ground or in-flight. For example, and without limitation, lift propulsor component includes a rotor and may include a propeller, paddle wheel and the like thereof, wherein a rotor is a component that produces torque along the longitudinal axis, and a propeller produces torquer along the vertical axis. As used in this disclosure a "rotor" is a hub with a number of radiating airfoils that is rotated in an approximately horizontal plane to provide the lift for a rotary wing aircraft such as a helicopter. In one or more embodiments, a rotor may include blades attached to a hub, or may be manufactured as a single piece with an integral hub. Hub may provide a central structure to which blades connect, and in some embodiments, may be made in a shape that envelops motor. Motor may include a rotating part and a stationary part. In one embodiment, rotating part may be concentric to stationary part, known as a radial flux motor. In this embodiment, stationary part may form the outer ring of motor, known as an in runner motor, or stationary part may form the inner ring of motor, known as an outrunner motor. In other embodiments, rotating and stationary parts may be flat and arranged in opposition to each other, known as an axial flux motor. Rotor may be attached to rotating part of motor. Stationary part of motor, in one embodiment, may be attached to propulsion boom. In some embodiments, motor may be a permanent magnet motor and may be controlled by an electronic motor controller. Electronic motor controller may be configured to send electrical currents to motor in a precise sequence to allow rotor to turn at a desired speed or with a desired torque. In some embodiments, this motor controller may be coupled or communicatively connected to flight controller or may be a part of flight controller.

In an embodiment, lift propulsor component includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be $3.2°$ as a function of a pitch angle of $9.7°$ and a relative wind angle $6.5°$. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of $4.7°$ as a function of a pitch angle of $7.1°$ and a relative wind angle $5.4°$, wherein the angle adjusts and/or shifts to a second angle of $5.7°$ as a function of a pitch angle of $5.1°$ and a relative wind angle $5.4°$. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include $18°$. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 1, lift propulsor component may be configured to produce a lift. As used in this disclosure a "lift" is a perpendicular force to the oncoming flow direction of fluid surrounding the surface. For example, and without limitation relative air speed may be horizontal to aircraft 100, wherein lift force may be a force exerted in a vertical direction, directing aircraft 100 upwards. In an embodiment, and without limitation, lift propulsor component may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components 108 such as a power sources may apply a torque on lift propulsor component to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 1, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

The configuration/arrangement of modular battery packs 108 not only depends on the aircraft's center of gravity but also payload. Payload, defined as anything carried on the aircraft besides the aircraft itself, materials used or usable for maintaining flight, or flight crew such as pilots, co-pilots, flight attendants, security personnel, or the like, includes both sapient payload and non-sapient payload. Sapient payload may include a number of persons transported on the aircraft besides flight crew such as pilots, co-pilots, flight attendants, security personnel, or the like; sapient payload may include, for instance, patients being transported for medical purposes. Sapient payload may include prisoners being transported from one facility to another. Sapient payload may include one or more persons that have arranged to travel on an aircraft for an aeronautic excursion; one or more persons may be travelling for business, pleasure, governmental functions, or the like. One or more persons may include one or more persons that have obtained a right of passage on the aircraft for the aeronautic excursion by remunerative means, for instance by providing currency, electronic payment, drafts, or the like to an operator of the aircraft; one or more persons may be passengers. Non-sapient payload may include a quantity or number of elements of payload, as defined above, that are not sapient payload. For instance, and without limitation, non-sapient payload may include inanimate objects, non-human living organisms such as animals, plants, or the like, materials such as construction materials, or any other item or items of payload that may be transported on an aircraft for an aeronautic excursion. Non-sapient payload may be expressed as a number of items, a volume occupied by a single item or in the aggregate by a plurality of items including without limitation the set of all items to be transported on the aircraft for at least a portion of the aeronautic excursion, a weight of a single item, a weight of a plurality of items including without limitation the set of all items to be transported on the aircraft for at least a portion of the aeronautic excursion, or any combination thereof. Non-limiting examples of non-sapient payload may include elements of non-sapient payload carried by one or more persons making up sapient payload, including without limitation suitcases, "carry-on" bags, backpacks, parcels, crates, chests, or the like and/or one or more elements of freight as described in further detail below.

Figure 2:
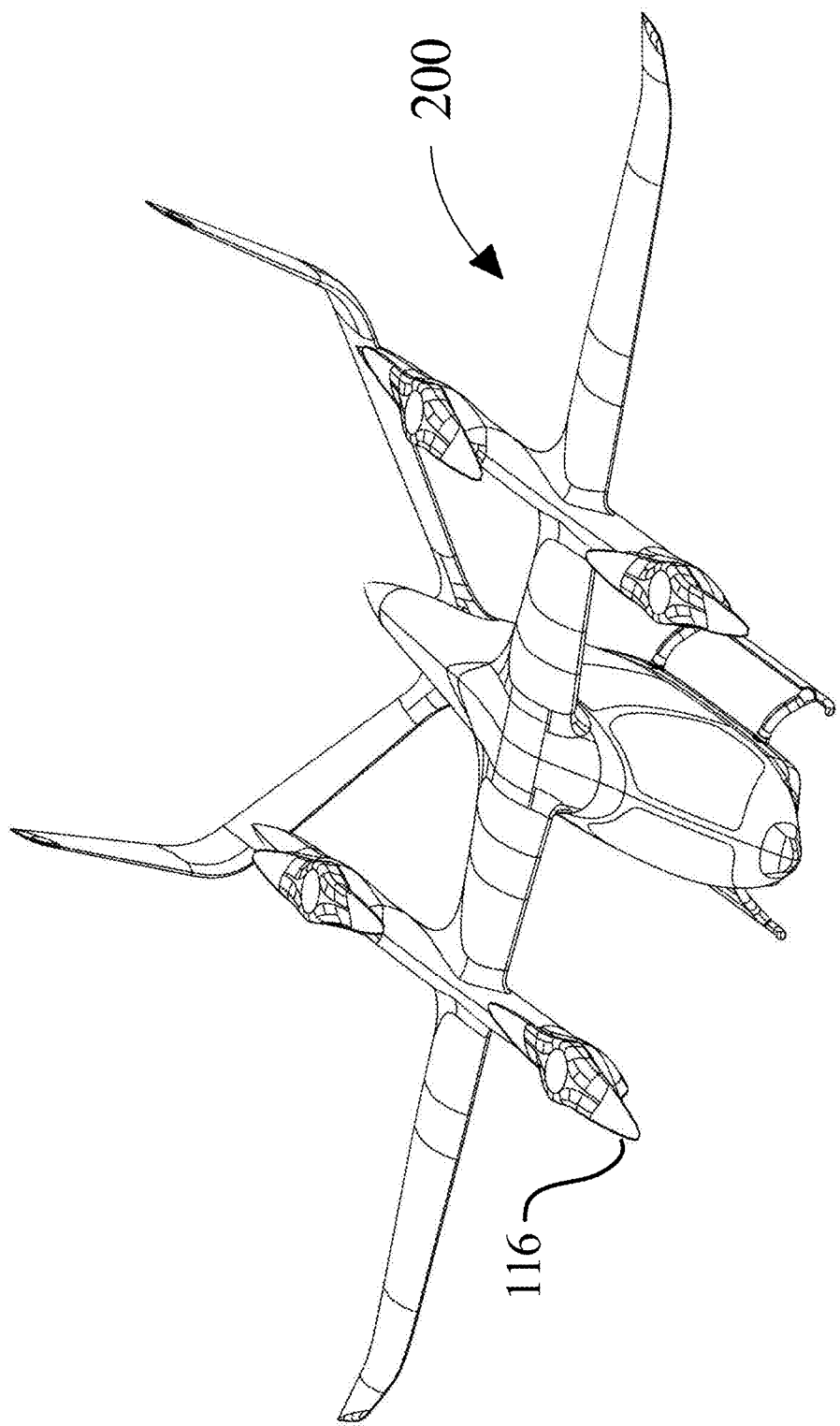
FIG. 2 is a schematic representation of an exemplary electric aircraft

Referring now to FIG. 2, an exemplary embodiment of an electric aircraft 200 with a propulsor 116 is illustrated in accordance with one or more embodiments of the present disclosure. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 104 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eVTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

As used in this disclosure, a vertical take-off and landing (eVTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 104, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where an aircraft is capable of flight using wings and/or foils that generate lift caused by the aircraft's forward airspeed and the shape of the wings and/or foils, such as airplane-style flight.

In one or more embodiments, aircraft may include motor, which may be mounted on a structural feature of an aircraft. Design of motor may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of aircraft. For example, and without limitation structural feature may be any portion of a vehicle incorporating motor, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 116. Persons skilled in the art, upon reviewing the entirety of this disclosure, will be aware of various materials, combinations of materials, and/or constructions techniques.

Still referring to FIG. 2, a rotor may be used for a plurality of various flight components of electric aircraft 200, such as a propulsor 116. For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about longitudinal axis A. In one or more exemplary embodiments, propulsor 116 may include a vertical propulsor or a forward propulsor. A forward propulsor may include a propulsor configured to propel aircraft in a forward direction. A vertical propulsor may include a propulsor configured to propel aircraft in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In an embodiment, propulsor 116 may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g. a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 2, a propulsor 116 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1545 N to force aircraft to in a horizontal direction along the longitudinal axis. As a further non-limiting example, pusher component may twist and/or rotate to pull air behind it and, at the same time, push aircraft 208 forward with an equal amount of force. In an embodiment, and without limitation, the more air forced behind aircraft, the greater the thrust force with which aircraft is pushed horizontally will be. In another embodiment, and without limitation, forward thrust may force aircraft through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In one or more embodiments, propulsor 116 includes a motor. Motor may include, without limitation, any electric motor, where an electric motor is a device that converts electrical energy into mechanical energy, for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers (not shown) or other components for regulating motor speed, rotation direction, torque, and the like.

Figure 3:
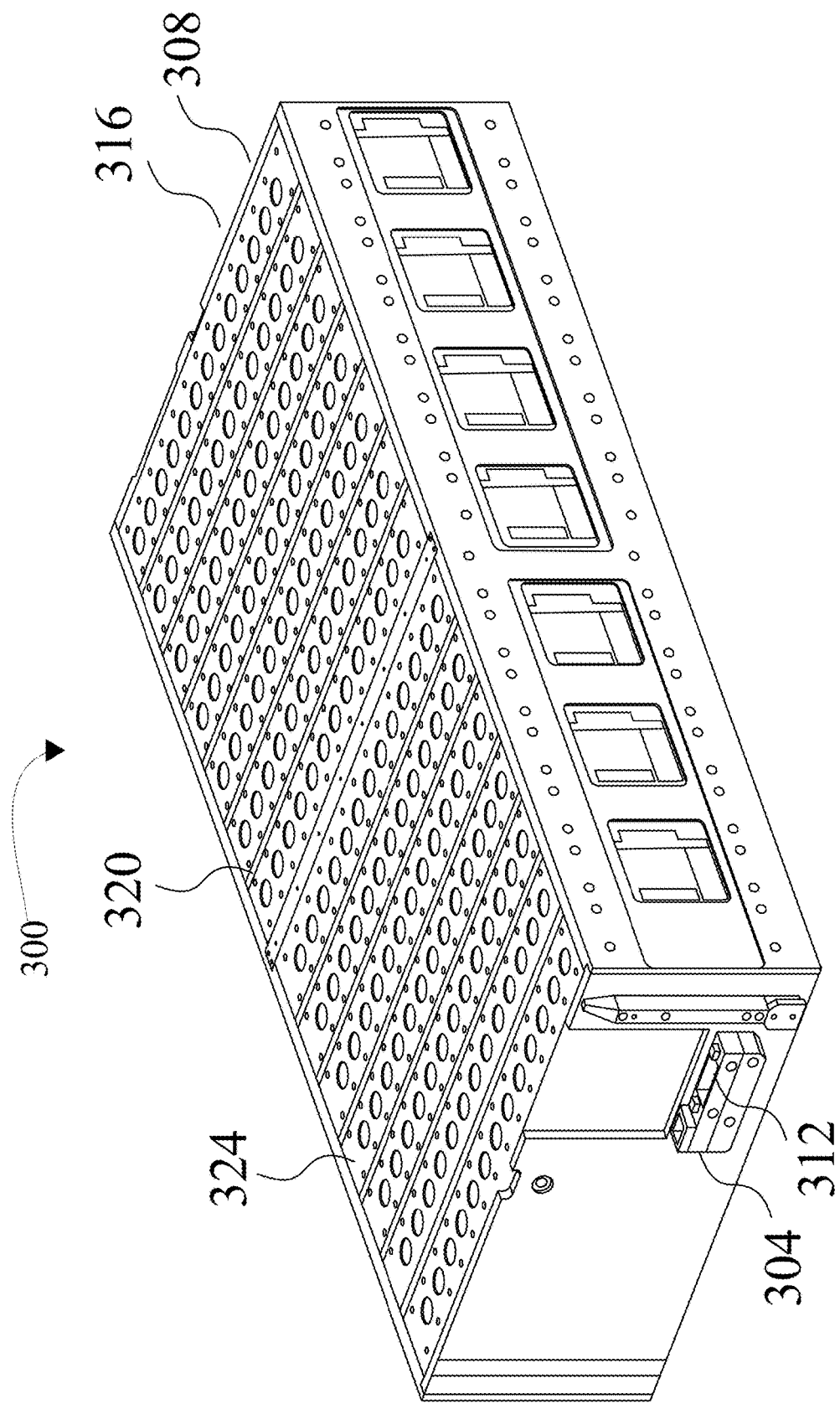
FIG. 3 is a schematic illustration of an exemplary battery pack.

With reference to FIG. 3, an exemplary embodiment of an eVTOL aircraft battery pack is illustrated. Battery pack is a power source that is configured to store electrical energy in the form of a plurality of battery modules, which themselves include of a plurality of electrochemical cells also referred to herein as battery cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same potential (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 300 include 196 battery cells in series and 18 battery cells in parallel. This is, as someone of ordinary skill in the art would appreciate, is only an example and battery pack 300 may be configured to have a near limitless arrangement of battery cell configurations.

With continued reference to FIG. 3, battery pack includes a plurality of battery modules. The battery modules 324 may be wired together in series and in parallel. Battery pack may include a center sheet which may include a thin barrier. Barrier may include a fuse connecting battery modules 324 on either side of the center sheet. Fuse may be disposed in or on center sheet and configured to connect to an electric circuit comprising a first battery module and another battery unit and cells. In general, and for the purposes of this disclosure, a "fuse" is an electrical safety device that operate to provide overcurrent protection of an electrical circuit. As a sacrificial device, a fuse's essential component is metal wire or strip that melts when too much current flows through it, thereby interrupting energy flow. Fuse may include a thermal fuse, mechanical fuse, blade fuse, expulsion fuse, spark gap surge arrestor, varistor, or a combination thereof.

Battery pack may also include a side wall which may include a laminate of a plurality of layers configured to thermally insulate plurality of battery modules from external components of battery pack. Side wall layers may include materials which possess characteristics suitable for thermal insulation as described in the entirety of this disclosure like fiberglass, air, iron fibers, polystyrene foam, and thin plastic films, to name a few. Side wall may additionally or alternatively electrically insulate plurality of battery modules from external components of battery pack and layers of which may include polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination. Side wall may include a feature for alignment and coupling to center sheet. This feature may include a cutout, slots, holes, bosses, ridges, channels, and/or other undisclosed mechanical features, alone or in combination.

With continued reference to battery pack may also include an end panel including a plurality of electrical connectors and further configured to fix battery pack in alignment with at least side wall. End panel may include a plurality of electrical connectors of a first gender configured to be electrically and mechanically coupled to electrical connectors of a second gender. End panel may be configured to convey electrical energy from battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. Plurality of electrical connectors may include blind mate connectors, plug and socket connectors, screw terminals, ring and spade connectors, blade connectors, and/or an undisclosed type alone or in combination. Electrical connectors of which end panel includes may be configured for power and communication purposes. A first end of end panel may be configured to mechanically couple to a first end of a first side wall by a snap attachment mechanism, similar to end cap and side panel configuration utilized in battery module. To reiterate, a protrusion disposed in or on the end panel may be captured, at least in part, by a receptacle disposed in or on the side wall. A second end of end panel may be mechanically coupled to a second end of a second side wall in a similar or the same mechanism.

With continued reference to FIG. 3, at least a sensor may be disposed in or on a portion of battery pack near battery modules or battery cells. A first sensor suite may be disposed in or on a first portion of battery pack and second sensor suite may be disposed in or on a second portion of battery pack. Battery pack includes first high voltage front end 304 disposed on a first end of battery pack. First high voltage front end 304 is configured to communicate with a flight controller using a controller area network (CAN). Controller area network includes bus 312. Bus 312 may include an electrical bus. "Bus", for the purposes of this disclosure and in electrical parlance is any common connection to which any number of loads, which may be connected in parallel, and share a relatively similar voltage may be electrically coupled. Bus may refer to power busses, audio busses, video busses, computing address busses, and/or data busses. Bus 312 may be responsible for conveying electrical energy stored in battery pack to at least a portion of an electric aircraft. Bus 312 may be additionally or alternatively responsible for conveying electrical signals generated by any number of components within battery pack to any destination on or offboard an electric aircraft. First high voltage front end 304 may comprise wiring or conductive surfaces only in portions required to electrically couple bus 312 to electrical power or necessary circuits to convey that power or signals to their destinations. Outputs from sensors or any other components present within system may be analog or digital. Onboard or remotely located processors can convert those output signals from sensor suite to a usable form by a destination of those signals. Usable form of output signals from sensors, through processor may be either digital, analog, a combination thereof or an otherwise unstated form. Processing may be configured to trim, offset, or otherwise compensate outputs of sensor suite. Based on sensor output, processor can determine output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

With continued reference to FIG. 3, battery pack includes second high voltage front end 108 disposed on a second end of battery pack. Second high voltage front end 108 may be configured to communicate with a flight controller by utilizing a controller area network (CAN). Second high voltage front end 308 includes second bus 316. Second bus 316 may include power busses, audio busses, video busses, computing address busses, and/or data busses. Bus 312 may be responsible for conveying electrical energy stored in battery pack to at least a portion of an electric aircraft. Bus 312 may be additionally or alternatively responsible for conveying electrical signals generated by any number of components within battery pack to any destination on or offboard an electric aircraft. Second high voltage front end 308 may comprise wiring or conductive surfaces only in portions required to electrically couple bus 312 to electrical power or necessary circuits to convey that power or signals to their destinations.

With continued reference to FIG. 3, any of the disclosed components or systems, namely battery pack, battery module sense board 320, and/or battery cells may incorporate provisions to dissipate heat energy present due to electrical resistance in integral circuit. Battery pack includes one or more battery element modules wired in series and/or parallel. The presence of a voltage difference and associated amperage inevitably will increase heat energy present in and around battery pack as a whole. The presence of heat energy in a power system is potentially dangerous by introducing energy possibly sufficient to damage mechanical, electrical, and/or other systems present in at least a portion of exemplary aircraft 104. Battery pack may include mechanical design elements, one of ordinary skill in the art, may thermodynamically dissipate heat energy away from battery pack. The mechanical design may include, but is not limited to, slots, fins, heat sinks, perforations, a combination thereof, or another undisclosed element. Heat dissipation may include material selection beneficial to move heat energy in a suitable manner for operation of battery pack. Certain materials with specific atomic structures and therefore specific elemental or alloyed properties and characteristics may be selected in construction of battery pack to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack may include similar or identical features and materials ascribed to battery pack in order to manage the heat energy produced by these systems and components. According to embodiments, the circuitry disposed within or on battery pack may be shielded from electromagnetic interference. Battery elements and associated circuitry may be shielded by material such as mylar, aluminum, copper a combination thereof, or another suitable material. Battery pack and associated circuitry may include one or more of the aforementioned materials in their inherent construction or additionally added after manufacture for the express purpose of shielding a vulnerable component. Battery pack and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. Shielding may include an aforementioned material in this section, a mechanical design configured to dissipate the interfering energy, and/or a combination thereof. Shielding comprising material, location and additional shielding elements may defend a vulnerable component from one or more types of energy at a single time and instance or include separate shielding for individual potentially interfering energies.

Still referring to FIG. 3, battery module sense board 320 may include a first opposite and opposing flat surface and may be configured to cover a portion of battery module within battery pack and face directly to at least an end of electrochemical battery cells. Battery module sense board 320 may be consistent with the sense board disclosed in U.S. patent application Ser. No. 16/948,540 entitled, "System and Method for High Energy Density Battery Module" and incorporated herein by reference in its entirety. At least a first sensor may, in some embodiments be disposed on a first side of battery module sense board 320 and at least a second sensor may be disposed on a second side of battery module sense board 320. Alternatively, at least a first sensor may be disposed on a first end of battery module sense board 320 and at least a second sensor second battery management component may be disposed on a second end of battery module sense board 320.

Figure 4:
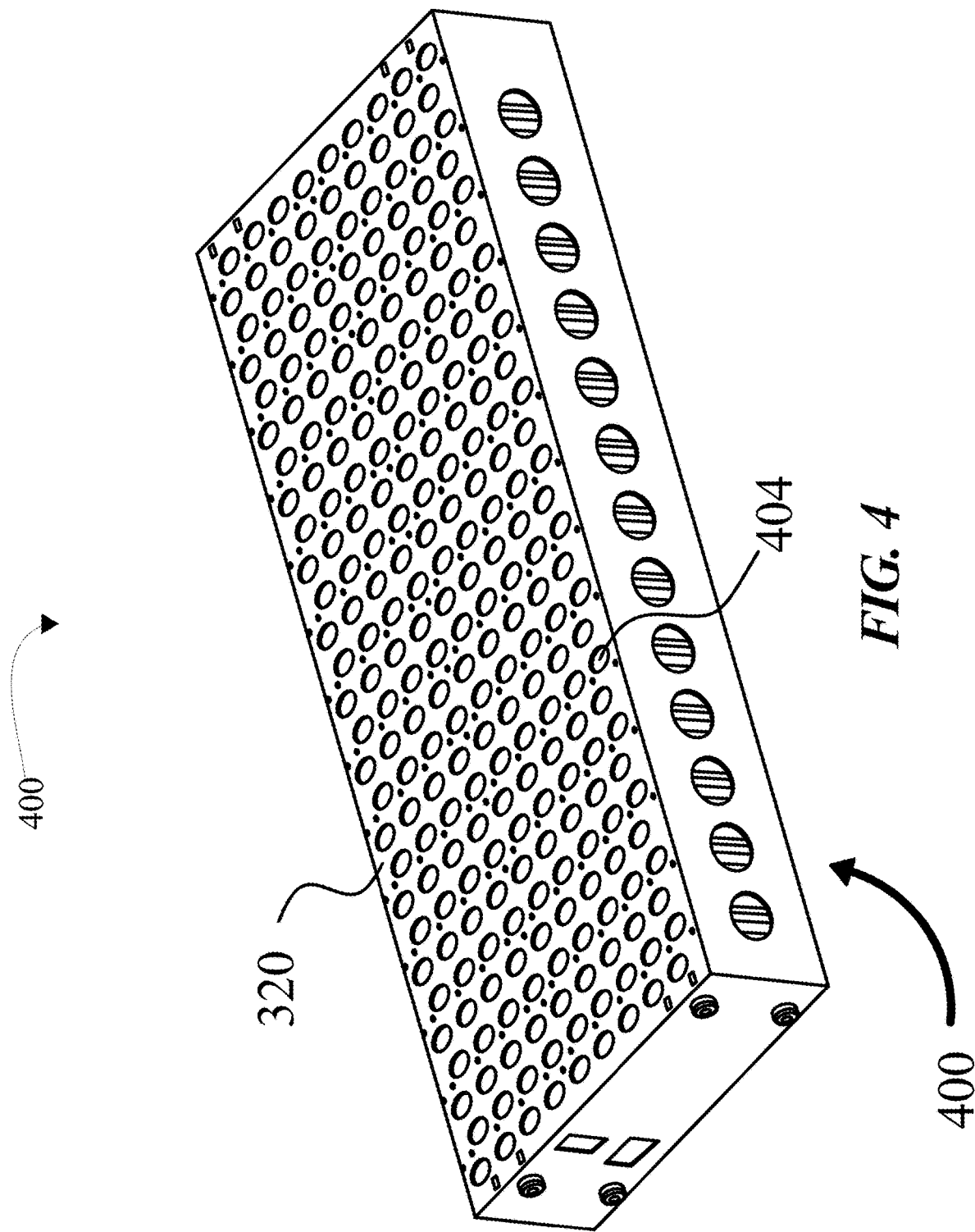
FIG. 4 is a schematic representation of an exemplary battery module.

With reference to FIG. 4, battery module 400 is presented including battery module sense board 420 shown opening aligned with the battery cells 404. Battery module sense board 420 may monitor battery cells 404. Battery module sense board 420 may include a rectangular prism shape configured to be opposite and oppose a back plate with openings correlating to battery cells 404. Battery module sense board 420 may include one or more circuits and/or circuit elements, including without limitation a printed circuit board component, aligned with a first side of battery module 400 and the openings correlating to the battery cells 404. Battery module sense board 420 may include, without limitation, a control circuit configured to perform and/or direct any actions performed by battery module sense board 420 and/or any other component and/or element described in this disclosure; control circuit may include any analog or digital control circuit, including without limitation a combinational and/or synchronous logic circuit, a processor, microprocessor, microcontroller, or the like.

Still referring to FIG. 4, battery module sense board 420 may include at least a sensor or sensor suite configured to measure physical and/or electrical parameters, such as without limitation temperature and/or voltage, of one or more battery cells. Battery module sense board 420 may be configured to aggregate battery data from a plurality of sensors and sensor suites. In some cases, battery module sense board 420 may perform signal analysis on one or more signals from at least a sensor and/or sensor suite. Battery module sense board 420 and/or a control circuit incorporated therein and/or communicatively connected thereto, may further be configured to detect failure within each battery cell 404, for instance and without limitation as a function of and/or using detected physical and/or electrical parameters. Cell failure may be characterized by a spike in temperature and battery module sense board 420 may be configured to detect that increase and generate signals, to notify users, support personnel, safety personnel, maintainers, operators, emergency personnel, aircraft computers, or a combination thereof and stored in data storage system. In some embodiments, battery module sense board 420 may be communicatively connected to server, for example without limitation by way of at least a network. In some cases, battery module sense board 420 may be configured to generate a battery degradation metric and communicate at least one of battery degradation metric and battery data to server.

Figure 5:
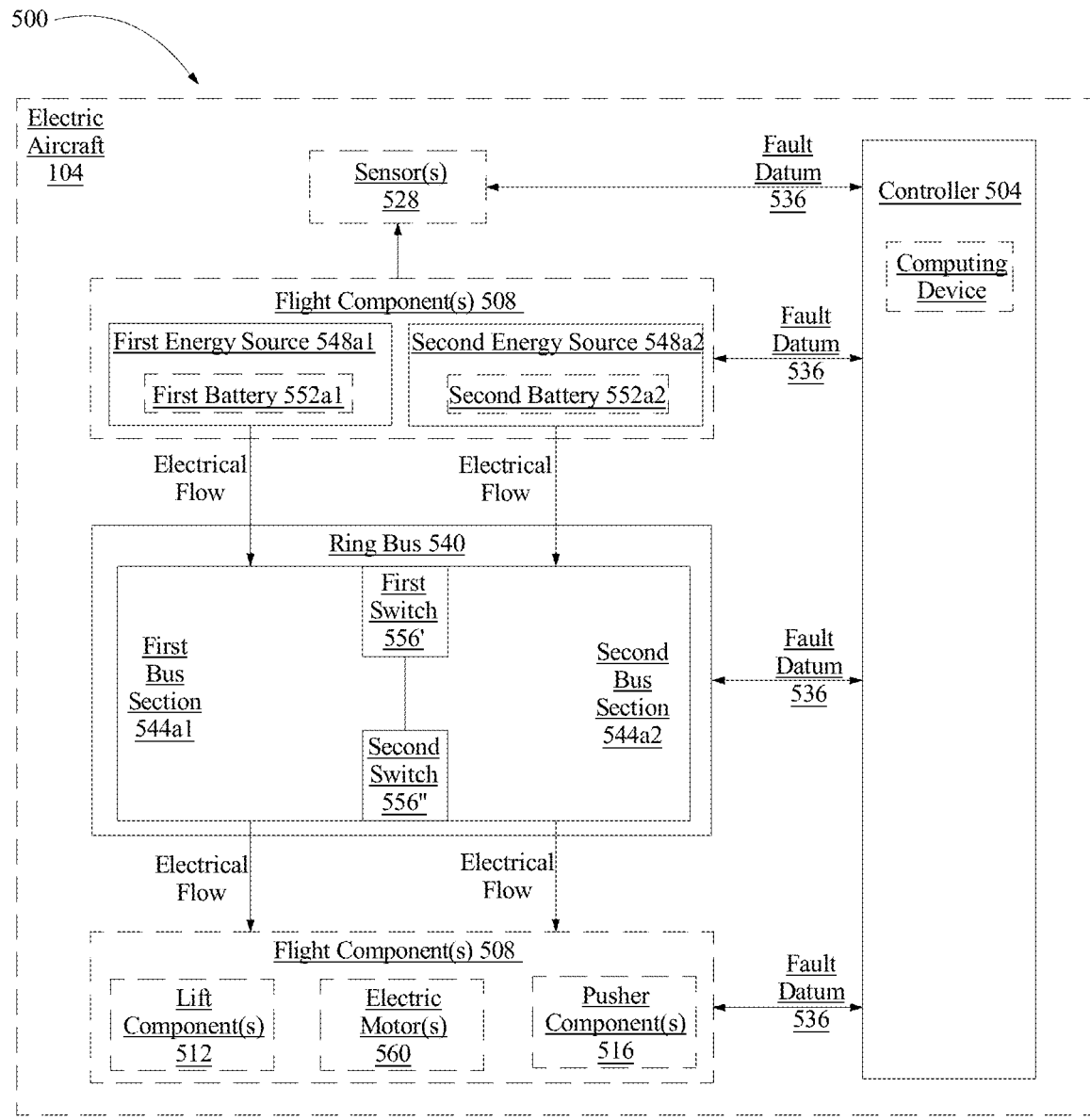
FIG. 5 is a block diagram of an exemplary embodiment of a system for redistributing electrical load consisting of a ring bus in an electric aircraft.

Referring now to FIG. 5, system 500 includes at least a controller (or computing device) 504. Controller (or computing device) 504 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device 504 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 504 may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 5, controller (or computing device) 504 may be designed and/or configured to perform any method, method step, or sequence of method steps in any embodiment described in this disclosure, in any order and with any degree of repetition. For instance, controller (or computing device) 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 5, in some embodiments, system 500 for redistributing electrical load in an electric aircraft includes controller (or computing device) 504 and a ring bus 540. Ring bus 540 includes a plurality of bus sections 544. Plurality of bus sections 544 includes a first bus section 544a1 and a second bus section 544a2. First bus section 544a1 is electrically connected to a first energy source 548a1. Second bus section 544a2 is electrically connected to a second energy source 548a2. Second bus section 544a2 is selectively electrically connected to first bus section 544a1. Stated differently, first bus section 544a1 and second bus section 544a2 are selectively electrically connected or connectable to one another. First energy source 548a1 and second energy source 548a2 are configured to provide electrical energy to an electrical load of an electric aircraft 104. Controller (or computing device) 504 is communicatively connected to ring bus 540. Controller 504 is configured to receive a fault datum 536 indicative of a fault associated with one of first energy source 552a1 and second energy source 552a2. Controller 504 is configured to actuate, as a function of fault datum 536, at least a switch 556 (first switch 556', second switch 556") to electrically connect first bus section 544a1 and second bus section 544a2 so as to form an electrical merger of first bus section 544a1 and second bus section 544a2. Controller 504 is configured to redistribute electrical load to compensate for fault associated with one of first energy source 548a1 and second energy source 548a2.

Still referring to FIG. 5, electric aircraft 104 may include any of the electric aircrafts as disclosed in the present disclosure. Electric aircraft 104 may include a controller 504 communicatively connected to various aircraft components. In one or more embodiments, controller 504 may include a flight controller. Electric aircraft 104 may include a flight component 508 (or a plurality of flight components 508) and a flight controller. Flight component(s) 508 may include at least a lift component 512 (or a plurality of lift components 512) and at least a pusher component 516 (or a plurality of pusher components 516). Flight component(s) 508 may further include at least an electric motor 560 (or a plurality of electric motors 560) which may be used to drive one or more lift components 512 and/or pusher components 516.

With continued reference to FIG. 5, Flight component(s) 508 may include at least an energy source 548 (or a plurality of energy sources 548 including first energy source 548a1 and second energy source 548a2) which may be used to provide electrical energy to one or more electric motors 560. Each energy source(s) 548 (548a1, 548a2) may include at least a battery 552 (552a1, 552a2) or a plurality of batteries 552. Energy source(s) 548 (548a1, 548a2) may include one or more battery packs, battery modules, battery units, battery cells, and the like. Certain aspects of flight components, flight controller and other components of electric aircraft are described in further detail later herein.

Still referring to FIG. 5, in an embodiment, controller 504 may include a flight controller communicatively connected to electric aircraft 104. Controller 504 may be communicatively connected to any of the components of electric aircraft 104. In an embodiment, controller 504 may be communicatively and/or electrically connected to ring bus 540 (and any of its elements) of system 500. Controller 504 may be communicatively and/or electrically connected to plurality of bus sections of ring bus 540 such as first bus section 544a1 and second bus section 544a2. Controller 504 may be communicatively and/or electrically connected to one or more switches of or associated with ring bus 540 such as first switch 556' and second switch 556". Controller 504 may be communicatively and/or electrically connected any flight component 508 such as lift component(s) 512, pusher component(s) 516, electric motor(s) 560, energy source(s) 548, battery(ies) 552 including first energy source 548a1, second energy source 548a2, first battery 552a1 and second battery 552a2. Controller 504 may be communicatively and/or electrically connected to one or more sensors 528 of or associated with electric aircraft 104. In an embodiment, controller 504 may be further configured to actuate at least a switch 556 (556' or 556") by transmitting an electrical signal to the at least a switch.

Still referring to FIG. 5, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 5, controller (or computing device) 504 may include any suitable computing device and/or combination of computing devices communicatively connected to electric aircraft and/or its components. In some embodiments, controller 104 may be remote or spaced from electric aircraft 104. Alternatively, or additionally, controller 504, and/or selected portions of it, may be on or onboard electric aircraft 104. In an embodiment, controller 504 may include, or be a part of, flight controller of electric aircraft 104, as needed or desired.

Continuing to refer to FIG. 5, in an embodiment, each of first energy source 548a1 and second energy source 548a2 may include at least one battery pack. In an embodiment, each of first energy source 548a1 and second energy source 548a2 may include at least one battery.

With continued reference to FIG. 5, as used in this disclosure, an "energy source" is a source (or supplier) of energy (or power) to power one or more components. Energy source 548 may include one or more battery(ies) 552 and/or battery packs. As used in this disclosure, a "battery pack" is a set of any number of identical (or non-identical) batteries or individual battery cells. These may be configured in a series, parallel or a mixture of both configuration to deliver a desired electrical flow, current, voltage, capacity, or power density, as needed or desired. A battery may include, without limitation, one or more cells, in which chemical energy is converted into electricity (or electrical energy) and used as a source of energy or power. For example, and without limitation, energy source may be configured provide energy to an aircraft power source that in turn that drives and/or controls any other aircraft component such as other flight components. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, a battery pack, or a plurality of battery cells connected in series into a module and each module connected in series or in parallel with other modules. Configuration of an energy source containing connected modules may be designed to meet an energy or power requirement and may be designed to fit within a designated footprint in an electric aircraft.

In an embodiment, and still referring to FIG. 5, an energy source may be used to provide a steady supply of electrical flow or power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high state of charge (SOC), as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Lithium ion (Li-ion) batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 5, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

Continuing to refer to FIG. 5, energy sources, battery packs, batteries, sensors, battery sensors, sensor suites and/or associated methods which may efficaciously be utilized in accordance with some embodiments are disclosed in U.S. Nonprovisional application Ser. No. 17/111,002, filed on Dec. 3, 2020, entitled "SYSTEMS AND METHODS FOR A BATTERY MANAGEMENT SYSTEM INTEGRATED IN A BATTERY PACK CONFIGURED FOR USE IN ELECTRIC AIRCRAFT," U.S. Nonprovisional application Ser. No. 17/108,798, filed on Dec. 1, 2020, and entitled "SYSTEMS AND METHODS FOR A BATTERY MANAGEMENT SYSTEM INTEGRATED IN A BATTERY PACK CONFIGURED FOR USE IN ELECTRIC AIRCRAFT," and U.S. Nonprovisional application Ser. No. 17/320,329, filed on May 54, 2021, and entitled "SYSTEMS AND METHODS FOR MONITORING HEALTH OF AN ELECTRIC VERTICAL TAKE-OFF AND LANDING VEHICLE," the entirety of each one of which is incorporated herein by reference.

With continued reference to FIG. 5, other energy sources, battery packs, batteries, sensors, battery sensors, sensor suites and/or associated methods which may efficaciously be utilized in accordance with some embodiments are disclosed in U.S. Nonprovisional application Ser. No. 16/590,496, filed on Oct. 2, 2019, and entitled "SYSTEMS AND METHODS FOR RESTRICTING POWER TO A LOAD TO PREVENT ENGAGING CIRCUIT PROTECTION DEVICE FOR AN AIRCRAFT," U.S. Nonprovisional application Ser. No. 17/348,137, filed on Jun. 15, 2021, and entitled "SYSTEMS AND METHODS FOR RESTRICTING POWER TO A LOAD TO PREVENT ENGAGING CIRCUIT PROTECTION DEVICE FOR AN AIRCRAFT," U.S. Nonprovisional application Ser. No. 17/008,721, filed on Sep. 1, 2020, and entitled "SYSTEM AND METHOD FOR SECURING BATTERY IN AIRCRAFT," U.S. Nonprovisional application Ser. No. 16/948,157, filed on Sep. 4, 2020, and entitled "SYSTEM AND METHOD FOR HIGH ENERGY DENSITY BATTERY MODULE," U.S. Nonprovisional application Ser. No. 16/948,540, filed on Sep. 4, 2020, and entitled "SYSTEM AND METHOD FOR HIGH ENERGY DENSITY BATTERY MODULE," and U.S. Nonprovisional application Ser. No. 16/948,541, filed on Sep. 4, 2020, and entitled "COOLING ASSEMBLY FOR USE IN A BATTERY MODULE ASSEMBLY," the entirety of each one of which is incorporated herein by reference. Still other energy sources, battery packs, batteries, sensors, sensor suites, charging connectors and/or associated methods which may efficaciously be utilized in accordance with some embodiments are disclosed in U.S. Nonprovisional application Ser. No. 17/405,840, filed on Aug. 18, 2021, entitled "CONNECTOR AND METHODS OF USE FOR CHARGING AN ELECTRIC VEHICLE,".

Still referring to FIG. 5, certain battery, battery module and battery pack management systems, devices, components and associated methods including or using a pack monitoring unit (PMU) and a module monitor unit (MMU) which may efficaciously be utilized in accordance with some embodiments are disclosed in U.S. Nonprovisional application Ser. No. 17/529,653, filed on Nov. 18, 2021, and entitled "AN ELECTRIC AIRCRAFT BATTERY PACK AND METHODS OF USE," U.S. Nonprovisional application Ser. No. 17/529,447, filed on Nov. 18, 2021, and entitled "MODULE MONITOR UNIT FOR AN ELECTRIC AIRCRAFT BATTERY PACK AND METHODS OF USE," and U.S. Nonprovisional application Ser. No. 17/529,583, filed on Nov. 18, 2021, and entitled "PACK MONITORING UNIT FOR AN ELECTRIC AIRCRAFT BATTERY PACK AND METHODS OF USE FOR BATTERY MANAGEMENT," the entirety of each one of which is incorporated herein by reference.

Still referring to FIG. 5, as used in this disclosure a "power source" is a source that powers, drives and/or controls any flight component and/or other aircraft component. For example, and without limitation power source may include motor(s) or electric motor(s) 560 that operates to move one or more lift components 512 and/or one or more pusher components 516, to drive one or more blades, or the like thereof. Motor(s) 560 may be driven by direct current (DC) electric power and may include, without limitation, brushless DC electric motors, switched reluctance motors, induction motors, or any combination thereof. Motor(s) 560 may also include electronic speed controllers or other components for regulating motor speed, rotation direction, and/or dynamic braking. A "motor" as used in this disclosure is any machine that converts non-mechanical energy into mechanical energy. An "electric motor" as used in this disclosure is any machine that converts electrical energy into mechanical energy.

Still referring to FIG. 5, in an embodiment, at least a switch 556 (556', 556") includes a cross-tie switch or X-tie switch. As used in this disclosure, a "cross-tie switch" is an electrical transfer switch that switches a load between two sources. A cross-tie switch may be used as a breaker that can be closed to connect two separate systems together. Alternatively, or in addition, other types of switches, electromechanical devices or similar devices such as magnetic switches, limit switches, level switches, pressure switches, membrane switches, selector switches, rotary switches, slide switches, toggle switches, contact switches, multi-contact switches, combinations thereof, and the like, among others, may be efficaciously used, as needed or desired.

Still referring to FIG. 5, in an embodiment, electrical load to be satisfied by at least one energy source 548 (548a, 548b) may be a function of an electrical power input of at least a flight component (e.g. flight component 508) of electric aircraft 104. As used in this disclosure, an "electrical load" is an electrical component or portion of a circuit that consumes electric or electrical power. The term may also refer to the power consumed by a circuit. This is opposed to an energy or power source, such as a battery or generator, which produces power. For example, and without limitation, electric or electrical power may be consumed, directly or indirectly, by one or more electric motors 560, lift components 512 and/or pusher components 516.

Still referring to FIG. 51, in an embodiment, system 500 may further include one or more sensors 528. Sensor(s) 158 may be configured to detect fault datum 536. Sensor(s) 528 may be configured to transmit, directly or indirectly, fault datum 536 to controller (or computing device) 504. Senor(s) 528 may be communicatively connected to controller 504. In an embodiment sensor 528 may include a battery sensor. In an embodiment, sensor(s) 528 may be included in or be a part of controller 504 and/or flight controller. Sensor(s) 528 may include any of the sensors as disclosed in the entirety of the present disclosure.

With continued reference to FIG. 5, in some embodiments, sensor 528 may be mechanically connected to electric aircraft 104. As used herein, a person of ordinary skill in the art would understand "mechanically connected" to mean that at least a portion of a device, component, or circuit is connected to at least a portion of the aircraft via a mechanical connection. Said mechanical connection may be established, for example and without limitation, by mechanical fasteners such as bolts, rivets, screws, nails, bolt-nut combinations, pegs, dowels, pins, rods, locks, latches, clamps, combinations thereof, and the like, among others. Said mechanical connection may include, for example and without limitation, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, adhesive coupling, universal joints, or any combination thereof. In an embodiment, mechanical connection may be used to connect the ends of adjacent parts and/or objects of an electric aircraft. Further, in an embodiment, mechanical connection may be used to join two pieces of rotating electric aircraft components. In some instances, the terminology "mechanically coupled" may be used in place of mechanically connected in this disclosure.

Still referring to FIG. 5, sensor 528(*s*) may include any of the sensors as disclosed in the entirety of the present disclosure. As used in this disclosure, a "sensor" is a device that is configured to detect a phenomenon and transmit information related to the detection of the phenomenon. For example, in some cases a sensor may transduce a detected phenomenon, such as without limitation, voltage, current, resistance, capacitance, impedance, distance, speed, velocity, angular velocity, rotational velocity, acceleration, direction, force, torque, temperature, pressure, humidity, precipitation, density, and the like, into a sensed signal. Sensor may include one or more sensors which may be the same, similar or different. Sensor may include a plurality of sensors which may be the same, similar or different. Sensor may include one or more sensor suites with sensors in each sensor suite being the same, similar or different.

Still referring to FIG. 5, sensor 528 may include any sensor or noise monitoring circuit described in this disclosure. Sensor 528, in some embodiments, may be communicatively connected or coupled to flight controller. Sensor may be a device, module, and/or subsystem, utilizing any hardware, software, and/or any combination thereof to sense a characteristic and/or changes thereof, in an instant environment, for example and without limitation, which the sensor may be proximal to or otherwise in a sensed communication with, and transmit information associated with the characteristic, for instance without limitation digitized data. Sensor 528 may be mechanically and/or communicatively coupled to aircraft 104. Sensor 528 may be configured to sense a characteristic associated with, for example and without limitation, a battery and/or a pilot control of aircraft. An environmental sensor may include without limitation one or more sensors used to detect ambient temperature, barometric pressure, and/or air velocity. Sensor 528 may include without limitation gyroscopes, accelerometers, inertial measurement unit (IMU), and/or magnetic sensors, one or more humidity sensors, one or more oxygen sensors, or the like. Additionally or alternatively, sensor 528 may include at least a geospatial sensor. Sensor 528 may be located inside aircraft, and/or be included in and/or attached to at least a portion of aircraft. Sensor may include one or more proximity sensors, displacement sensors, vibration sensors, and the like thereof. Sensor may be used to monitor the status of aircraft 104 for both critical and non-critical functions. Sensor may be incorporated into vehicle or aircraft or, in some cases, be remote.

Continuing to refer to FIG. 5, non-limiting examples of sensor 528 may include an inertial measurement unit (IMU), an accelerometer, a gyroscope, a proximity sensor, a pressure sensor, a light sensor, a pitot tube, an air speed sensor, a wind sensor, a position sensor, a speed sensor, a switch, a thermometer, a strain gauge, an acoustic sensor, an electrical sensor, a current sensor, a voltage sensor, a capacitance sensor, a resistance sensor, an impedance sensor, a thermal sensor, a humidity sensor, an angle sensor, a velocity sensor, an acceleration sensor, an optical sensor, a magnetic sensor, an electromagnetic sensor, and the like, among others. In some cases, sensor 528 may sense a characteristic as an analog measurement, for instance, yielding a continuously variable electrical potential indicative of the sensed characteristic. In these cases, sensor 528 may additionally comprise an analog to digital converter (ADC) as well as any additionally circuitry, such as without limitation a Wheatstone bridge, an amplifier, a filter, and the like. For instance, in some cases, sensor 528 may comprise a strain gage configured to determine loading of one or more aircraft components, for example and without limitation, landing gear. Strain gage may be included within a circuit comprising a Wheatstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 104, for instance without limitation a computing system, a pilot display, and a memory component. Alternatively or additionally, sensor 528 may sense a characteristic of a pilot control digitally. For instance in some embodiments, sensor 528 may sense a characteristic through a digital means or digitize a sensed signal natively. In some cases, for example, sensor 528 may include a rotational encoder and be configured to sense a rotational position of a pilot control or the like; in this case, the rotational encoder digitally may sense rotational "clicks" by any known method, such as without limitation magnetically, optically, and the like. Sensor 528 may include any of the sensors as disclosed in the present disclosure. Sensor 528 may include a plurality of sensors. Any of these sensors may be located at any suitable position in or on aircraft 104.

With continued reference to FIG. 5, sensor 528 may include any device configured to measure and/or detect information related to electric aircraft 104. In a non-limiting embodiment, first sensor may include airspeed sensors, GPS sensors, altimeters, pitot tubes, pitot-static tubes, sensors and/or systems, external air density sensors (e.g. to facilitate in the calculation of stall speed and/or wind speed), pressure sensors, toque sensors, angle sensors (e.g., angle of attack, flight path angle), wind speed sensors, and the like, among others.

Still referring to FIG. 5, fault datum 536 may be transmitted to controller 504 by sensor(s) 528, flight component(s) 508, ring bus 540, switches 556 and/or any of the bus sections 544 of ring bus 540 including first bus section 544*a*1 and/or second bus section 544*a*2. Fault datum 536, in some embodiments, may indicate as fault, malfunction and/or degradation associated with any of the aircraft components including energy source(s) 548 and/or battery(ies) 552. Fault datum 536 may be indicative of an electrical or other issue involved in the operation of aircraft.

Still referring to FIG. 5, as used in this disclosure, a "fault datum" is information on a fault associated with an electric aircraft's operation. For example, and without limitation, fault may be a malfunction, disruption, irregularity and/or degradation associated with one or more components of electric aircraft. In an embodiment, fault datum 536 is indicative of a fault associated with energy source 548 of electric aircraft such as first energy source 548*a*1 and/or 548*a*2 including their respective batteries 552*a*1 and/or 552*a*2. Fault datum 536 may be in the form of an electrical signal. Fault datum 536 may include an analog signal or a digital signal. Fault datum 536 may include information on the health or performance of energy source(s) 548. Fault datum 536 may include information on a ground fault, a short circuit or other malfunctions (e.g. electrical) associated with energy source(s) 548 and/or ring bus 540 including bus sections 544 such as first bus section 544*a*1 and second bus section 544*a*2, flight component(s) 508 such as electric motor(s) 560, lift component(s) 512 and/or pusher component(s) 516. Fault datum 536 may include information on a state of charge (SOC) of battery(ies) 552, temperature of battery(ies) 552, output voltage and/or current of battery(ies) 552, discharge of battery(ies) 552, ambient conditions of battery(ies) 552, and the like, among others.

Continuing to refer to FIG. 5, in some embodiments, fault datum 536 may be communicated from one or more sensor(s) 528, including sensors configured to detect characteristics of battery 552 and/or energy source 548. This fault datum may then be provided to one or more controllers (or computing devices) such as controller 504 and/or flight controller.

With continued reference to FIG. 5, in some cases, fault datum 536 may be communicated from one or more sensors, for example sensor(s) 528 located within electric vehicle or aircraft 536. For example, in some cases, fault datum 536 may be associated with a battery within an electric vehicle or aircraft 536. For example, fault datum 536 may include a battery sensor signal from a battery sensor. As used in this disclosure, a "battery sensor" is a sensor used to measure a characteristic associated with a battery and a "battery sensor signal" is a signal representative of a characteristic of a battery. In some versions, controller 504 may additionally include a sensor interface configured to receive a sensor signal. Sensor interface may include one or more ports, an analog to digital converter, and the like. In some cases, a sensor, a circuit, and/or a controller computing device may perform one or more signal processing steps on a signal. For instance, sensor, circuit or computing device may analyze, modify, and/or synthesize a signal in order to improve the signal, for instance by improving transmission, storage efficiency, or signal to noise ratio. Battery sensor may include any suitable sensor as described in the entirety of the present disclosure, for example and without limitation, a temperature sensor, a voltage sensor, a current sensor, a resistance sensor, a Hall effect sensor, a Wheatstone bridge sensor, a capacitance sensor, an impedance sensor, a multimeter, a state of charge (SOC) sensor, a Daly detector, an electroscope, an electron multiplier, a Faraday cup, a galvanometers, a Hall probe, a magnetic sensor, an optical sensor, a magnetometer, a magnetoresistance sensor, a MEMS magnetic field sensor, a metal detector, a planar Hall sensor, a thermal sensor, and the like, among others.

Still referring to FIG. 5, as used in this disclosure, "communication" or "connection" is an attribute wherein two or more relata interact with one another, for example within a specific domain or in a certain manner. In some cases communication or connection between two or more relata may be of a specific domain, such as without limitation electric communication or connection, fluidic communication or connection, informatic communication or connection, mechanic communication or connection, and the like. As used in this disclosure, "electric(al) communication" or "electric(al) connection" is an attribute wherein two or more relata interact with one another by way of an electric current or electricity in general. As used in this disclosure, "fluidic communication" or "fluidic connection" is an attribute wherein two or more relata interact with one another by way of a fluidic flow or fluid in general. As used in this disclosure, "informatic communication" or "informatic connection" is an attribute wherein two or more relata interact with one another by way of an information flow or information in general. As used in this disclosure, "mechanic(al) communication" or "mechanic(al) connection" is an attribute wherein two or more relata interact with one another by way of mechanical means, for instance mechanic effort (e.g., force) and flow (e.g., velocity). An "electrical merger" means that two or more components has electrically merged such that they are now in electrical communication or have formed an electrical connection.

Still referring to FIG. 5, as used in this disclosure, "actuate" is to cause a machine or device to operate or perform an operational step. For example, and without limitation, actuation of a switch can mean that the switch has been turned on or off, or opened or closed, or the like. In general, actuate refers to activating or operating a machine, device, or the like.

Still referring to FIG. 5, as used in this disclosure, a "ring bus" is a closed loop or ring circuit in which each bus section is separated by a switch or circuit breaker. Typically, the switches are closed (or off) so as to electrically isolate each bus section until it is desired or needed to electrically merge any selected bus sections. For example, ring bus 540 includes first bus section 544a1 and second bus section 544a2 which are typically electrically isolated by switches or circuit breakers 556', 556". Actuation of (to open) one or both of these switches can form an electrical merger of these two bus sections of ring bus 540. Certain bus and ring bus configurations are disclosed in U.S. Nonprovisional application Ser. No. 17/348,240, filed on Jun. 15, 2021, and entitled "SYSTEM AND METHOD FOR DYNAMIC EXCITATION OF AN ENERGY STORAGE ELEMENT CONFIGURED FOR USE IN AN ELECTRIC AIRCRAFT," the entirety of which is incorporated herein by reference.

Still referring to FIG. 5, in some embodiments, systems and methods of merging high voltage bus-work based on battery packs may use a ring bus to adapt to fewer batteries by "merging" buses and redistributing loads (e.g. electrical loads). These systems and methods may be provided in conjunction with an electric aircraft. Electric aircraft may be any aircraft powered by electricity, such as one or more electric motors and/or battery systems. Electric aircraft may be powered only by electricity or partially by electricity such as a hybrid-electric aircraft. In an embodiment, electric aircraft may be an electric vertical takeoff and landing (eVTOL) aircraft. Electrical load may be satisfied or met by one or more energy sources such as batteries, battery modules, battery packs and/or battery systems of electric aircraft.

Still referring to FIG. 5, system 500 for redistributing electrical load in an electrical aircraft includes ring bus 540 including plurality of bus sections 544. Each bus section may be selectively electrically connectable and isolatable from one another by a plurality of switches such as, for example, cross-tie or X-tie switches. Each bus section may be configured to transmit electrical power to one or more selected components or systems of electric aircraft. For example, electrical power may be transmitted to an electric propulsion unit (EPU) of electric aircraft such as an electric motor, a lift component, a pusher component, and the like. Other components to which electrical power may be provided may include, without limitation, a temperature management system, a communication system, a navigation system, pilot controls, and the like, among others.

Still referring to FIG. 5, plurality of bus sections 544 includes first bus section 544a1 electrically connected to first energy source (or energy storage element) 548a1. First bus section may include one or more bus elements with each bus element electrically connected to an energy source (e.g. battery or battery pack). Various switches, fuses and/or circuit breakers may be included in the electrical circuit of the first bus section, as needed or desired.

Still referring to FIG. 5, plurality of bus sections 544 includes second bus section 544a2 is electrically connected to second energy source (or energy storage element) 548a2. First energy source and second energy source are configured to provide electrical energy to an electrical load of an electric aircraft. Second bus section 544a2 is selectively electrically connected to (i.e., connectable and isolatable from) first bus section 544a1. Second bus section may include one or more bus elements with each bus element electrically connected to an energy source (e.g. battery or battery pack). Various switches, fuses and/or circuit breakers may be included in the electrical circuit of the second bus section, as needed or desired. Second bus section 544a2 may be electrically connected or electrically isolated from first bus section 544a1 by switches, circuit breakers and the like, such as, for example and without limitation, cross-tie or X-tie switches.

Still referring to FIG. 5, system 500 for redistributing electrical load in an electrical aircraft includes controller (or computing device) 504 communicatively connected to ring bus 104. controller may include one or more computing devices configured to control the operation of energy sources and associated components of electric aircraft. For example, and without limitation, controller may include a microcontroller, a microprocessor, a digital signal processor (DSP) and/or a system on a chip (SoC). Controller may include any circuit element or combination thereof. For example, and without limitation, controller 104 may include an analog circuit including one or more operational amplifiers and/or transistors. Controller 104 may also include, for example and without limitation, an application-specific integrated circuit (ASIC), a field programmable gate array (FPGA), a microcontroller and/or a computing device.

Still referring to FIG. 5, controller 504 is configured to receive fault datum 536 indicative of a fault associated with one of first energy source and second energy source. Fault may include any fault associated with the disruption of reliable electric power transmission from one or more of the energy sources such as, for example, a ground fault, a short circuit, a thermal overload, and the like. A sensor may (e.g. sensor 528) be used to detect the fault. Sensor may be an independent unit, or it may be a part of the controller. More than one sensor or a sensor suite may be used for fault detection. Suitable sensors may include, without limitation, a current sensor, a voltage sensor, a short circuit sensor, a ground fault sensor, a temperature sensor, a thermal sensor, a resistance sensor, an impedance sensor, a capacitance sensor, a battery sensor, and the like, among others.

Continuing to refer to FIG. 1, controller 104 is configured to actuate, as a function of fault datum 536, at least a switch (e.g. switches 556', 556") to electrically connect first bus section 544a1 and second bus section 544a2 so as to form an electrical merger of first bus section 544a1 and second bus section 544a2. Switches, such as and without limitation, cross-tie or X-tie switches may be "opened" (turned "on") by controller 504. As such, more, or less, electrical power may be drawn from a particular energy source to selected aircraft components (e.g. flight components 508 including electric motor(s) 560).

With continued reference to FIG. 5, controller 504 is configured to redistribute electrical load to compensate for the fault associated with one of first energy source 548a1 and second energy source 548a2. For example, the "healthy"

energy source may be used to compensate for the loss of the "faulty" energy source by now providing at least some of the electrical power lost due to the fault. Advantages of such a system may include, without limitation: adaptation to fewer energy sources (or batteries) by merging of buses and redistribution of electrical load; maximizing, or enhancing, access to energy sources (or batteries) after a fault or even otherwise; enhanced versatility in selection of energy sources (or batteries), for example, to provide additional power to a particular aircraft component; capability to reduce potential loss in thrust, for example, if the "faulty" energy source (or battery) was supplying electrical power to a thrust component of the electric aircraft, by provision of electrical power from the "healthy" energy source (or battery).

Figure 6:
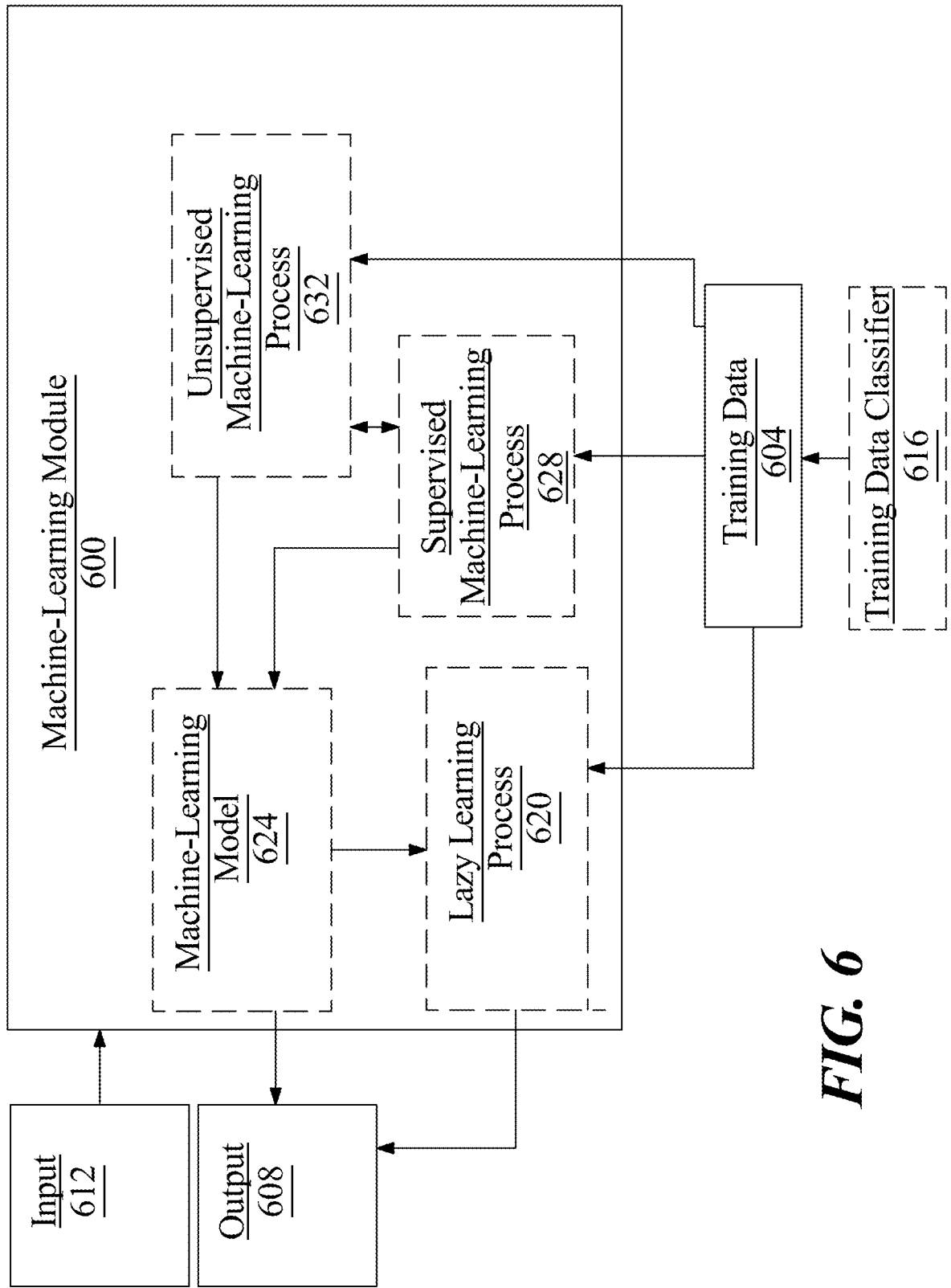
FIG. 6 is a block diagram of an exemplary embodiment of a machine-learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 604 to generate an algorithm that will be performed by a computing device/module to produce outputs 608 given data provided as inputs 612; this is in contrast to a non-machine-learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
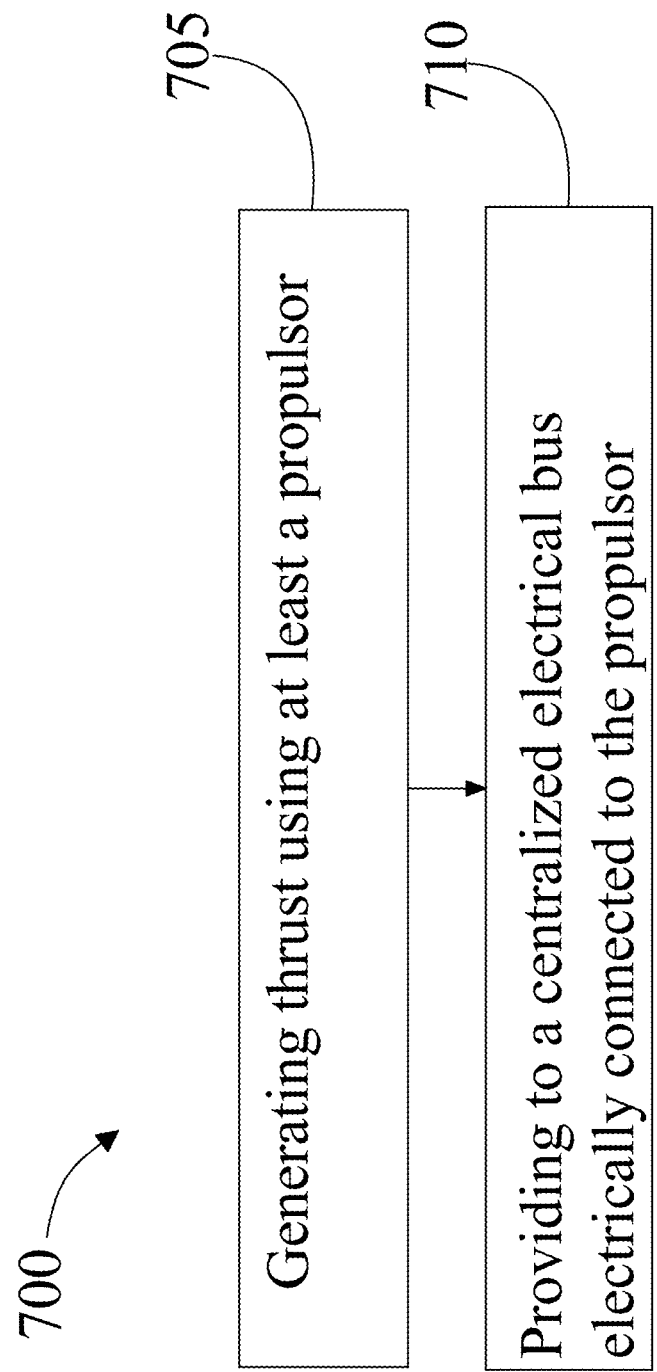
FIG. 7 is a is a flow diagram illustrating an exemplary method of modular battery configuration with centralized bus on an electric aircraft.

FIG. 7 shows an exemplary method 700 of modular battery configuration with a centralized bus on an electric aircraft illustrated by way of a flow diagram. At step 705, method 900 includes generating thrust using at least a propulsor.

With continued reference to FIG. 7, at step 710, method 900 may include providing to a centralized electrical bus electrically connected to the propulsor. Centralized bus may include any bus described in this disclosure, including for example with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
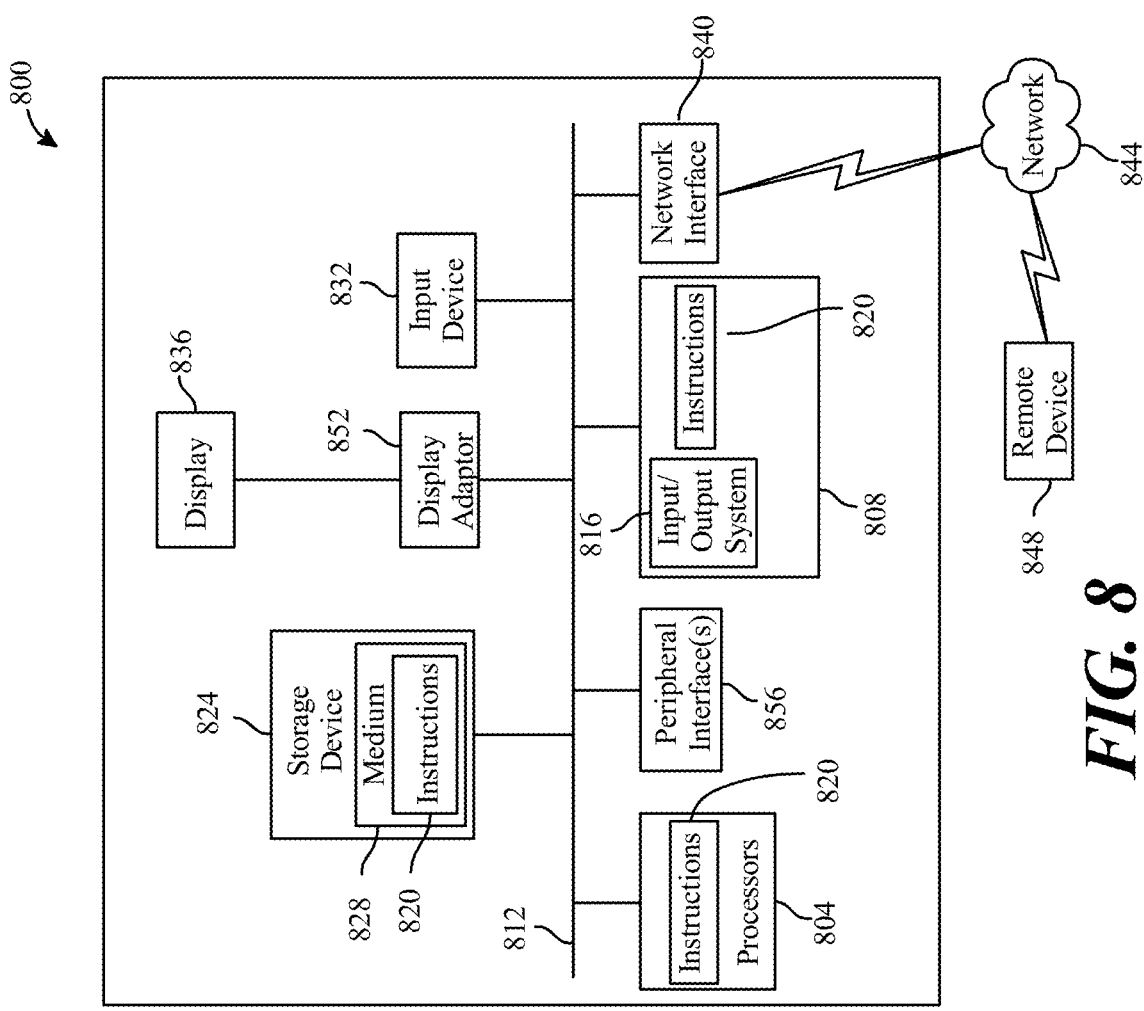
FIG. 8 is a block diagram of a computing system.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components hereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft, comprising:
   a longitudinal axis of an electric aircraft;
   a lateral axis of the electric aircraft, wherein the lateral axis is perpendicular to the longitudinal axis and intersects the longitudinal axis at a center of gravity of the electric aircraft;
   a plurality of battery packs;
   a plurality of propulsors comprising a first propulsor and a second propulsor; and
   a centralized electrical bus including a ring bus electrically connected to the first propulsor and the second propulsor of the plurality of propulsors and the plurality of battery packs, wherein:
      the ring bus includes a plurality of bus sections configured to be connected during use for electrical connection between each of the plurality of propulsors and each of the plurality of battery packs, and the plurality of bus sections are configured to be electrically isolated in response to a fault; and
   the plurality of battery packs are configured to provide electricity to the centralized electrical bus for selective distribution of the electricity to power the first propulsor and the second propulsor, and the plurality of battery packs are arranged substantially symmetrically about the lateral axis and the center of gravity of the electric aircraft, wherein the symmetric arrangement of the plurality of battery packs includes:
a first plurality of battery packs located on a forward side of the lateral axis of the electric aircraft and directly connected to a first one of the plurality of bus sections; and a second plurality of battery packs located on an aft side, symmetrically opposed to the forward side, of the lateral axis of the electric aircraft and directly connected to another one of the plurality of bus sections.

2. The electric aircraft of claim 1, wherein the plurality of battery packs includes a predetermined arrangement of battery packs, and wherein the predetermined arrangement allows removal of a battery pack from the plurality of battery packs while maintaining an offset of the center of gravity of the electric aircraft within a threshold.

3. The electric aircraft of claim 1, wherein the plurality of propulsors includes an electric propulsor.

4. The electric aircraft of claim 1, wherein the plurality of propulsors includes a rotor.

5. The electric aircraft of claim 2, wherein the battery pack of the plurality of battery packs is located within a floor of the electric aircraft.

6. The electric aircraft of claim 2, wherein the battery pack of the plurality of battery packs is located within a wing of the electric aircraft.

7. The electric aircraft of claim 2, wherein the battery pack of the plurality of battery packs is located within a fuselage of the electric aircraft.

8. The electric aircraft of claim 2, wherein the battery pack of the plurality of battery packs is located within a nose of the electric aircraft.

9. An electric aircraft, comprising:
a longitudinal axis of an electric aircraft;
a lateral axis of the electric aircraft, wherein the lateral axis is perpendicular to the longitudinal axis and intersects the longitudinal axis at a center of gravity of the electric aircraft;
a plurality of battery packs;
a plurality of propulsors comprising a vertical propulsor and a horizontal propulsor; and
a centralized electrical bus including a ring bus electrically connected to the vertical propulsor and the horizontal propulsor of the plurality of propulsors and the plurality of battery packs,
wherein:
the ring bus includes a plurality of bus sections configured to be connected during use for electrical connection between each of the plurality of propulsors and each of the plurality of battery packs, wherein the plurality of bus sections are configured to be electrically isolated in response to a fault; and
the plurality of battery packs are configured to provide electricity to the centralized electrical bus for selective distribution of the electricity to power the vertical propulsor and the horizontal propulsor, and the plurality of battery packs are arranged substantially symmetrically about the lateral axis and the center of gravity of the electric aircraft, wherein the symmetric arrangement of the plurality of battery packs includes:
a first plurality of battery packs located on a forward side of the lateral axis of the electric aircraft and directly connected to a first one of the plurality of bus sections; and
a second plurality of battery packs located on an aft side, symmetrically opposed to the forward side, of the lateral axis of the electric aircraft and directly connected to another one of the plurality of bus sections.

10. The electric aircraft of claim 9, wherein the plurality of battery packs includes a predetermined arrangement of battery packs, and wherein the predetermined arrangement allows removal of a battery pack from the plurality of packs while maintaining an offset of the center of gravity of the electric aircraft within a threshold.

11. The electric aircraft of claim 9, wherein the plurality of propulsors includes an electric propulsor.

12. The electric aircraft of claim 9, wherein the plurality of propulsors includes a rotor.

13. The electric aircraft of claim 10, wherein the battery pack of the plurality of battery packs is located within a floor of the electric aircraft.

14. The electric aircraft of claim 10, wherein the battery pack of the plurality of battery packs is located within a wing of the electric aircraft.

15. The electric aircraft of claim 10, wherein the battery pack of the plurality of battery packs is located within a fuselage of the electric aircraft.

16. The electric aircraft of claim 10, wherein the battery pack of the plurality of battery packs is located within a nose of the electric aircraft.

17. The electric aircraft of claim 1, wherein the plurality of battery packs further includes:
a third plurality of battery packs on a port side of the longitudinal axis of the electric aircraft; and
a fourth plurality of battery packs on a starboard side, symmetrically opposed to the port side, of the longitudinal axis of the electric aircraft, and wherein a combination of the first, second, third and fourth plurality of battery packs are substantially symmetric relative to the center of gravity, the lateral axis and the longitudinal axis of the electric aircraft.

18. The electric aircraft of claim 1, wherein the plurality of bus sections are selectively electrically connected by a plurality of switching devices, wherein a switching device of the plurality of switching devices includes a cross-tie switch.

19. The electric aircraft of claim 9, wherein the plurality of battery packs further includes:
a third plurality of battery packs located on a port side of the longitudinal axis of the electric aircraft; and
a fourth plurality of battery packs located on a starboard side, symmetrically opposed to the port side, of the longitudinal axis of the electric aircraft, and wherein a combination of the first, second, third and fourth plurality of battery packs are substantially symmetric relative to the center of gravity, the lateral axis and the longitudinal axis of the electric aircraft.

20. The electric aircraft of claim 9, wherein the plurality of bus sections are selectively electrically connected by a plurality of switching devices, wherein a switching device of the plurality of switching devices includes a cross-tie switch.

* * * * *

UNITED STATES PATENT AND TRADEMARK OFFICE
CERTIFICATE OF CORRECTION

PATENT NO. : 11,970,276 B2
APPLICATION NO. : 17/892273
DATED : April 30, 2024
INVENTOR(S) : Herman Wiegman It is certified that error appears in the above-identified patent and that said Letters Patent is hereby corrected as shown below:

In the Specification

Column 12, Line 21 reads: "...in U.S. Nonprovisional Application Ser. No. 16/603,225," but it should read: "...in U.S. Nonprovisional Application Ser. No. 16/703,225,"

Column 16, Line 5 reads: "With continued reference to battery pack may also include..." but it should read: "With continued reference to FIG. 3 battery pack may also include..."

Column 18, Line 27 reads: "...patent application Ser. No. 16/948,540 entitled "System and..." but it should read: "...patent application Ser. No. 16/948,140 entitled "System and..."

Column 24, Line 23 reads: "...DEVICE FOR AN AIRCRAFT," U.S. Nonprovisional..." but it should read: "...U.S. Nonprovisional..."

Column 24, Line 34 reads: "...visional application Ser. No. 16/948,540, filed on Sep. 4," but it should read: "...visional application Ser. No. 16/948,140, filed on Sep. 4,"

Column 24, Line 37 reads: "...Nonprovisional application Ser. No. 16/948,541, filed on..." but it should read: "...Nonprovisional application Ser. No. 16/948,141, filed on..."

Column 25, Line 43 reads: "Still referring to FIG. 51, in an embodiment, system 500..." but it should read: "Still referring to FIG. 5, in an embodiment, system 500..."

Signed and Sealed this
Eleventh Day of June, 2024

Katherine Kelly Vidal
*Director of the United States Patent and Trademark Office*